United States Patent [19]
Pring

[11] Patent Number: 6,099,022
[45] Date of Patent: Aug. 8, 2000

[54] CONVERTIBLE MULTI-FUNCTION STROLLER

[76] Inventor: Dara Pring, 611-10 Jayzel Dr., Weston, Canada, M9M-2C3

[21] Appl. No.: 09/020,920

[22] Filed: Feb. 9, 1998

[51] Int. Cl.$^7$ ...................................................... B62B 7/14
[52] U.S. Cl. ........................................ 280/648; 280/47.38
[58] Field of Search ............................ 280/31, 647, 648, 280/650, 654, 658, 47.371, 47.38, 47.4, 47.41, 79.2; 297/256.13, 256.16, 256.17

[56] References Cited

U.S. PATENT DOCUMENTS

| | | | |
|---|---|---|---|
| 3,550,998 | 12/1970 | Boudreau et al. | 280/31 |
| 4,102,010 | 7/1978 | Lazazzero | 280/47.371 |
| 4,412,689 | 11/1983 | Lee | 280/648 |
| 4,892,327 | 1/1990 | Cabagnero | 280/650 |
| 5,028,061 | 7/1991 | Hawkes | 280/650 |
| 5,074,575 | 12/1991 | Bigo | 280/647 |
| 5,385,386 | 1/1995 | Beamish et al. | 297/256.16 |
| 5,595,393 | 1/1997 | Batten | 280/47.371 |

FOREIGN PATENT DOCUMENTS

| | | | |
|---|---|---|---|
| 2491421 | 4/1982 | France | 280/47.38 |
| 2615155 | 11/1988 | France | 280/650 |
| 2254587 | 10/1992 | United Kingdom | 280/47.38 |
| 2262914 | 7/1993 | United Kingdom | 280/47.38 |

*Primary Examiner*—J. J. Swann
*Assistant Examiner*—F. B. Vanaman

[57] ABSTRACT

Disclosed is a convertible multi-function stroller. The stroller includes a frame structure with a set of wheel rotatably secured to its lower extent. The device further includes a child seat which is adapted to be removably secured to this frame structure. More specifically, the frame includes a pair of seat securing means on each of its sides. The child seat is adapted to be removably secured to an opposed pair of such securing means. The securing means are positioned to enable to child seat to be secured at an upper, or in the alternative, a lower position. Furthermore, the child seat can be totally removed to be used as a child carrier.

1 Claim, 5 Drawing Sheets

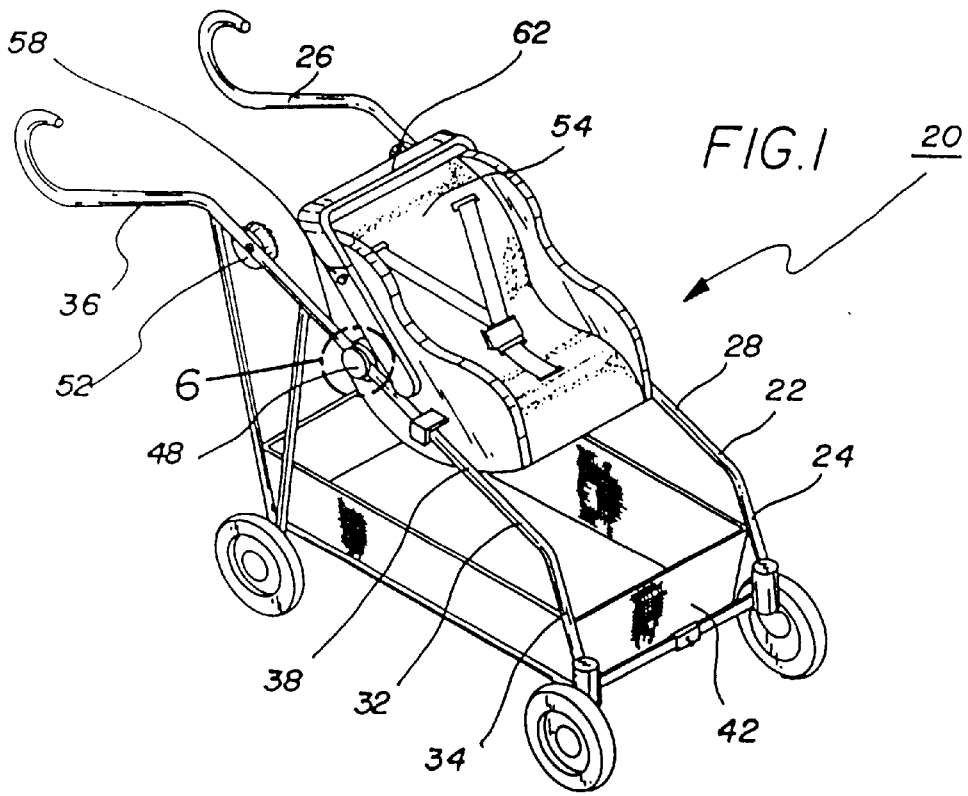
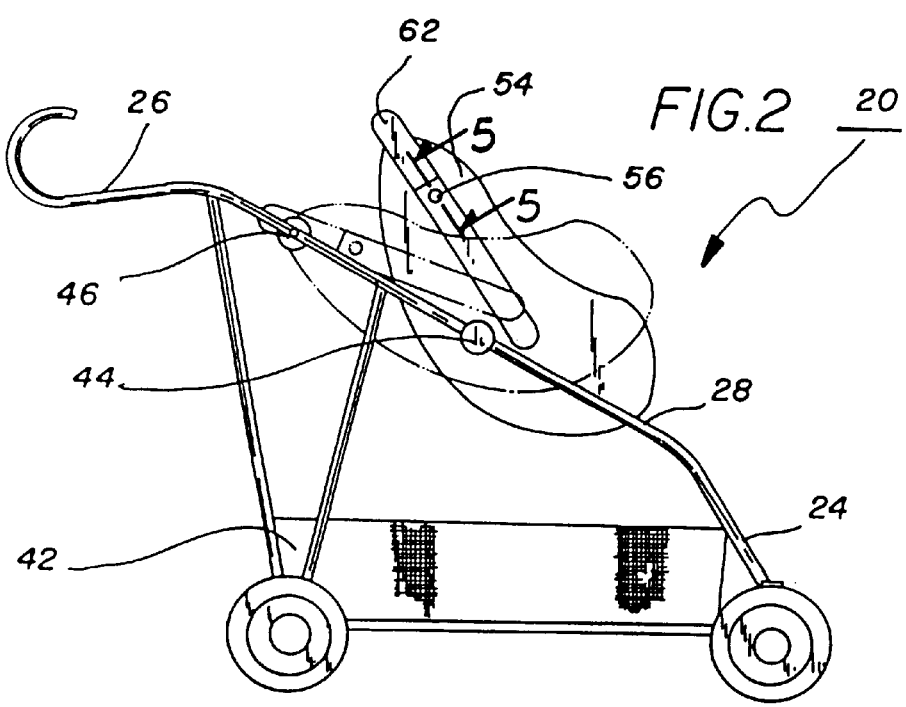

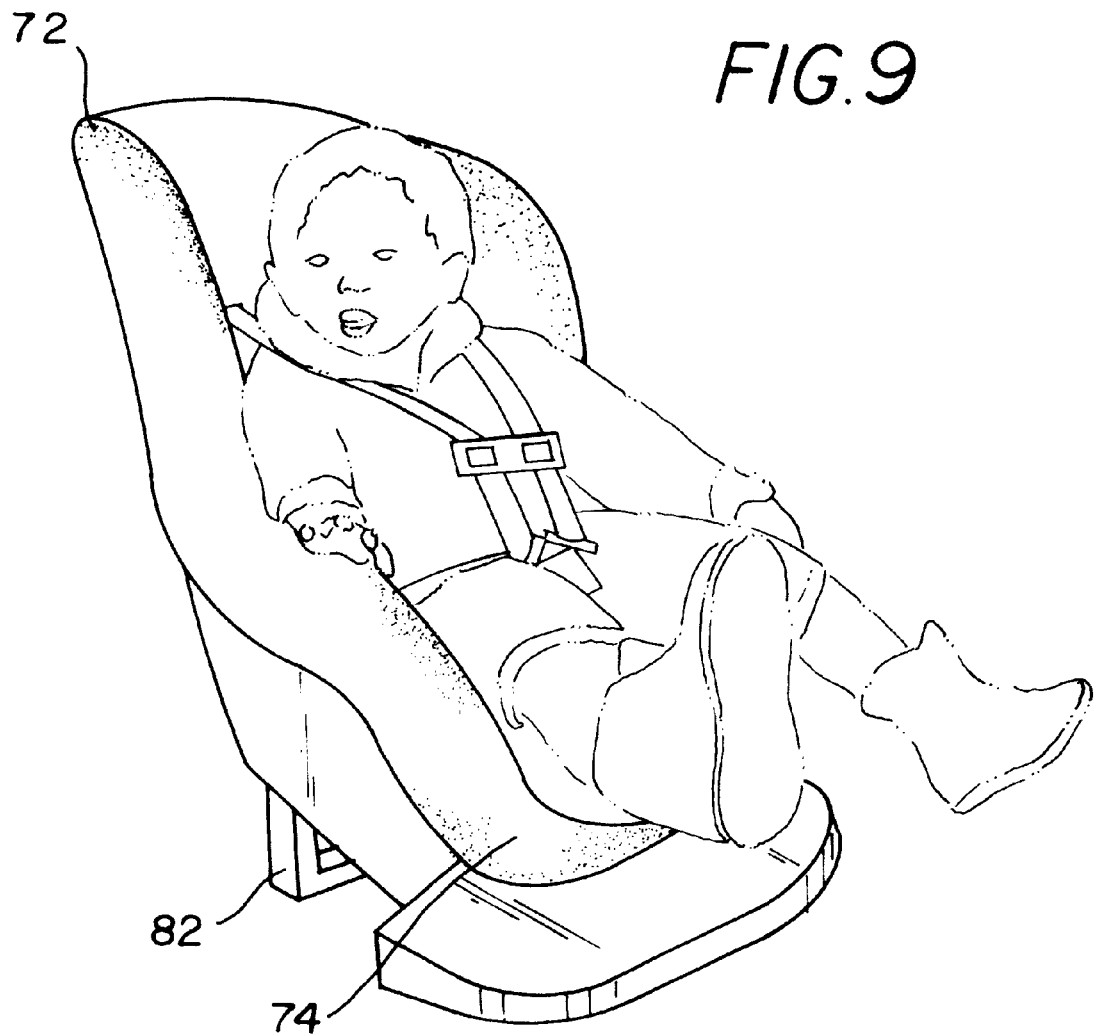

CONVERTIBLE MULTI-FUNCTION STROLLER

BACKGROUND OF THE INVENTION

1. Field of the Invention

The present invention relates to a multi-function stroller and more particularly pertains to such a stroller with a removable child seat.

2. Description of the Prior Art

The use of a strollers is known in the prior art. More specifically, strollers are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,230,523 to Wilhelm discloses a multi-functional child carrier device. U.S. Pat. No. 4,019,751 to Nakao discloses a multi-purpose infant's wheeled chair. U.S. Design Pat. No. 345,720 to Pohl discloses a car seat and baby stroller combination. U.S. Pat. No. 5,398,951 to Ryu discloses a convertible child car seat/stroller apparatus. U.S. Pat. No. 5,188,380 to Tucek discloses a general utility child seat apparatus. U.S. Pat. No. 4,786,064 to Baghsasarian discloses a convertible infant seat.

In this respect, the multi-function stroller of the present invention substantially departs from the conventional concepts and designs of the prior art, and in so doing provides an apparatus primarily developed for the purpose of enabling a user to employ the stroller as a child carrier, high chair or traditional stroller.

Therefore, it can be appreciated that there exists a continuing need for improved stroller configurations. In this regard, the present invention substantially fulfills this need.

SUMMARY OF THE INVENTION

In view of the foregoing disadvantages inherent in the known types of strollers now present in the prior art, the present invention provides a stroller with adjustable chair heights. As such, the general purpose of the present invention, which will be described subsequently in greater detail, is to provide a single device which can operate as a stroller, high chair, child or carrier.

To attain this, the present invention essentially comprises a convertible multi-function stroller. The stroller includes a frame structure with a set of wheels rotatably secured to its lower extent. The device further includes a child seat which is adapted to be removably secured to this frame structure. More specifically, the frame includes a pair of seat securing means on each of its sides. The child seat is adapted to be removably secured to an opposed pair of such securing means. The securing means are positioned to enable to child seat to be secured at an upper, or in the alternative, a lower position. Furthermore, the child seat can be totally removed to be used as a child carrier.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved convertible multi-function stroller. The stroller comprises a first side frame member having a lower extent with a pair of wheels rotatably secured thereon, a substantially horizontal upper extent, and an intermediate extent therebetween. The stroller also includes a second side frame member having a lower extent with a pair of wheels rotatably secured thereon, a substantially horizontal upper extent, and an intermediate extent therebetween. Additionally, a rectangular basket serves to interconnect the lower extents of the first and second side frames. A first side lower securing means is connected to the intermediate extent of the first side frame, the securing means comprises a circular housing with an associated peripheral edge with teeth formed thereon. A first side upper securing means is connected to the intermediate extent of the first side frame. This securing means comprises a circular housing with an associated peripheral edge with teeth formed thereon. A second side lower securing means is connected to the intermediate extent of the second side frame, with the securing means comprising a circular housing with an associated peripheral edge with teeth formed thereon. The second side upper securing means is connected to the intermediate extent of the second side frame. This securing means comprises a circular housing with an associated peripheral edge with teeth formed thereon. A child seat is adapted to be removably secured to the first and second side frames. The child seat has a first side with a securing means secured thereto, and a second side also with a securing means secured thereto. The first side securing means of the child seat is adapted to be interconnected to one of the first side securing means of the frame. The second side securing means of the child seat is adapted to be interconnected to one of the second side securing means of the frame. Additionally, a telescopic handle is pivotally secured to the child seat.

It is another object of the present invention to provide a stroller with multiple configurations.

It is a further object of the present invention to provide a stroller with a handle portion from which items can be hung.

An even further object of the present invention is to provide a stroller which is susceptible of a low cost of manufacture with regard to both materials and labor, and which accordingly is then susceptible of low prices of sale to the consuming public, thereby making such strollers economically available to the buying public.

Still yet another object of the present invention is to provide a stroller which provides in the apparatuses and methods of the prior art some of the advantages thereof, while simultaneously overcoming some of the disadvantages normally associated therewith.

Still another object of the present invention is to provide a stroller with multiple functions and configurations.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the multi-function stroller of the present invention.

FIG. 2 is a side elevational view of the multi-function stroller of the present invention.

FIG. 9 is a perspective view of the child seat in a second orientation. Similar reference characters refer to similar parts throughout the several views of the drawings.

DESCRIPTION OF THE PREFERRED EMBODIMENT

Figure 3:
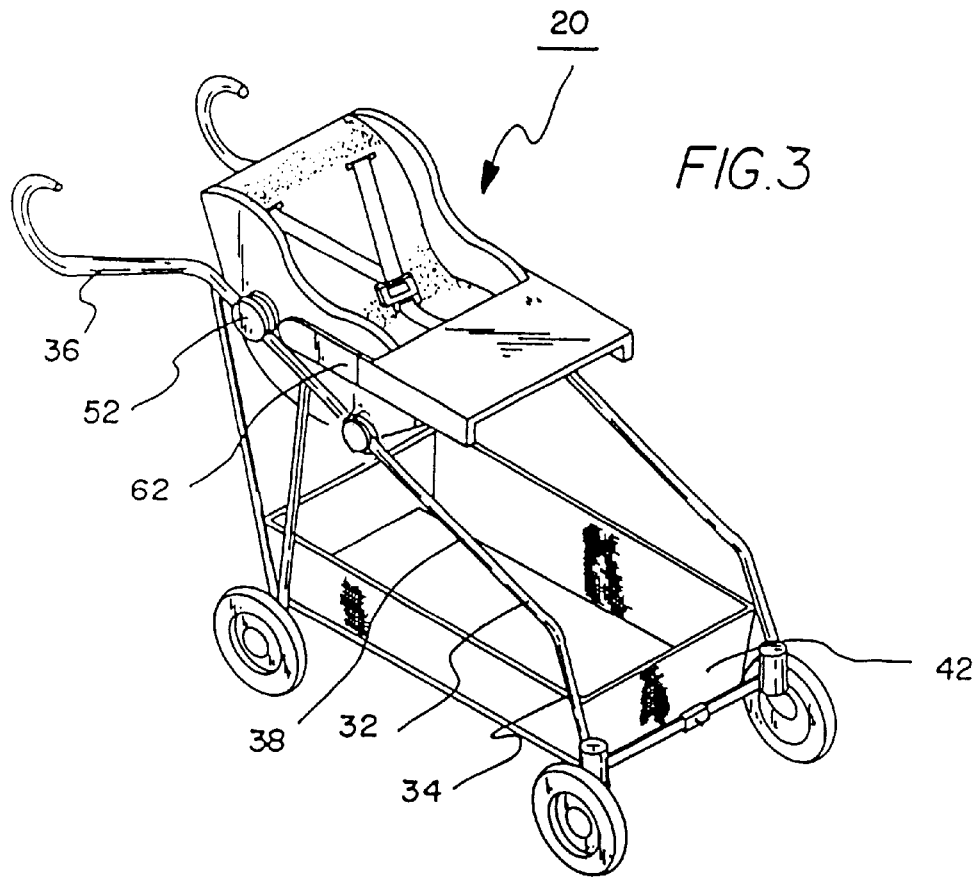
FIG. 3 is a perspective view of the multi-function stroller of the present invention with a tray table installed.
Figure 4:
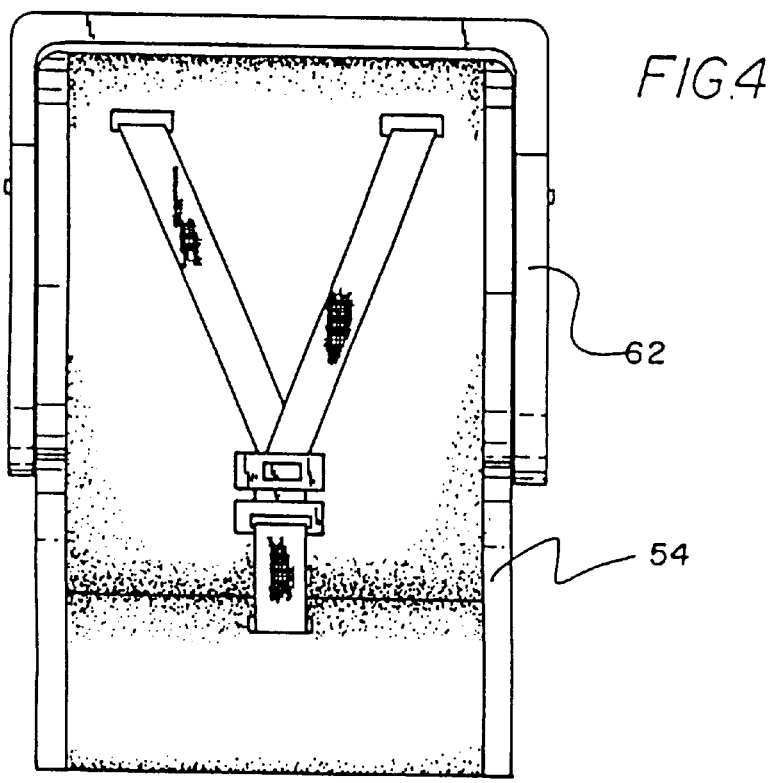
FIG. 4 is a front view of the child seat of the present invention.

The present invention relates to a convertible multi-function stroller. The stroller includes a frame structure with a set of wheel rotatably secured to its lower extent. The device further includes a child seat which is adapted to be removably secured to this frame structure. More specifically, the frame includes a pair of seat securing means on each of its sides. The child seat is adapted to be removably secured to an opposed pair of such securing means. The securing means are positioned to enable to child seat to be secured at an upper, or in the alternative, a lower position. Furthermore, the child seat can be totally removed to be used as a child carrier. The various components of the present invention, and the manner in which they interrelate, will be described in greater detail hereinafter.

The multi-function stroller 20 of the present invention is generally constructed from a pair of side frame members. Specifically, the stroller 20 includes a first side frame member 22. This first side frame member 22 is defined by a lower extent 24 with a pair of wheels rotatably secured thereon, a substantially horizontal upper extent 26, and an intermediate extent 28 therebetween.

Likewise, the second side frame member 32 has a lower extent 34 with a pair of wheels rotatably secured thereon, a substantially horizontal upper extent 36, and an intermediate extent therebetween 38. A rectangular basket 42 serves to interconnect the lower extents of the first and second side frames. The basket 42 can be employed to store various baby supplies or the like. The horizontal upper extents 26 and 36 of the frame components can be used in hanging items while transporting a child.

Figure 6:
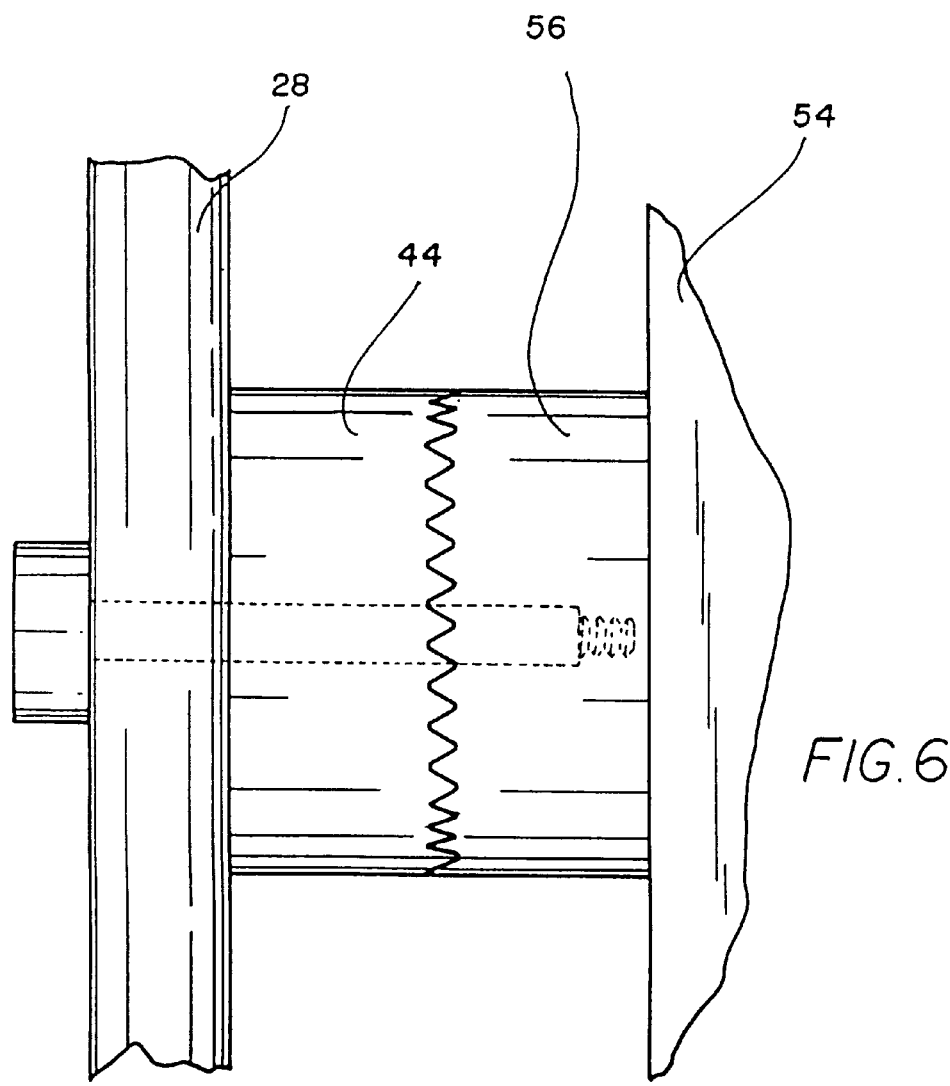
FIG. 6 is a detailed view taken from FIG. 1.

Each side of the frame also includes a pair of securing means. Specifically, a first side lower securing means 44 is connected to the intermediate extent 28 of the first side frame 22. Likewise, a first side upper securing means 46 is connected to the intermediate extent 28 of the first side frame 22. Each of these securing means comprises a circular housing with an associated peripheral edge with teeth formed thereon. One such securing means is illustrated in FIG. 6. In similar fashion, a second side lower securing means 48 is connected to the intermediate extent 38 of the second side frame 32, and a second side upper securing means 52 is connected to the intermediate extent 38 of the second side frame 32. Again, each of these securing means comprises a circular housing with an associated peripheral edge with teeth formed thereon. Each of the securing means is adapted to engage similar securing means attached to opposite sides of the child seat.

The child seat 54 is specifically adapted to be removably secured to the first and second side frames 22 and 32. The child seat 54 comprises a first side with a securing means 56 secured thereto, and a second side with a similar securing means 58 secured thereto. Specifically, each of these securing means takes the form of a circular housing with an associated peripheral edge with teeth formed thereon. Thus, the first side securing means 56 of the child seat 54 is adapted to be interconnected to one of the first side securing means 44 or 46 of the frame. Likewise, the second side securing means 58 of the child seat is adapted to be interconnected to one of the second side securing means of the frame 48 or 52.

More specifically, one of the of side securing means 56 or 58 of the seat 54 is adapted to engage on of the securing means of the frame. One such engagement is depicted in FIG. 6. The teeth of the two securing means are engaged to ensure that there is no relative movement between the two securing means. Additionally, a threaded engagement member is adapted to be inserted through the securement means of both the frame and seat and secured to the seat itself.

Thus, the securing means of the seat can be connected to the lower set of securing means of the frame to support a child at a lower level. Alternatively, the seat can be connected to the upper pair of securing means. Additionally, the child seat can be disengaged from the frame altogether and employed as a child carrier.

Figure 5:
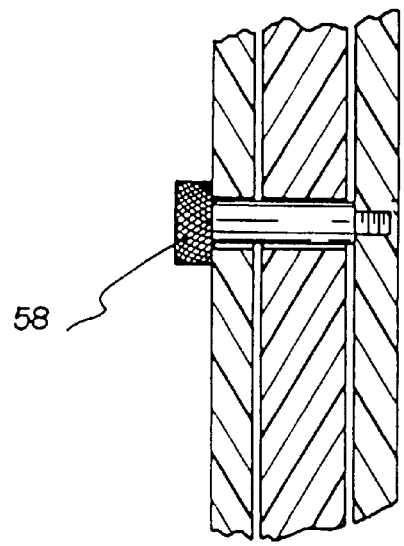
FIG. 5 is a view taken along line 5—5 of FIG. 2.

Furthermore, the child seat employs a telescopic handle 62 which is pivotally secured to the child seat 54. More specifically, the handle includes an intermediate portion which is slidably secured relative to an outer handle housing. The interconnection between the two handle components is achieved through a pair of opposed thumb screws. One such thumb screw 58 is illustrated in reference to FIG. 5. Additionally, the intermediate portion of the handle can be removed and replaced by a tray table. The tray table configuration is illustrated with reference to FIG. 3.

The details of the seat 54 will be described in conjunction with FIGS. 7–9. The child seat 54 is a multifunction seat which is specifically adapted for use in conjunction with the stroller 20. Additionally, when removed from the stroller 20, the seat can be used upon a vehicle seat. When used upon a vehicle seat, the child seat has two different orientations. These orientations will be described in greater detail hereinafter.

The seat 54 is defined by a seat frame 70 having an upper extent 72, a lower extent 74, and an intermediate extent 76 therebetween. The frame 70 further includes an outer external face and an internal face. Additionally, peripheral edges extending between the upper and lower extents, and a pair of lap belt receiving channels 78 are integrally formed within the peripheral edges of the seat frame 70 proximate the intermediate extent. With reference to FIG. 7, a leg 82 is pivotally attached to the external face of the seat frame 70 proximate to the intermediate extent 76. With continuing reference to FIG. 7,the seat 70 includes a rocking plunger 84 having an associated driving means 86 for reciprocating the plunger in a linear fashion. The rocking plunger 84 and associated driving means 86 are positioned within the seat frame 70 proximate to the lower extent 74.

Figure 7:
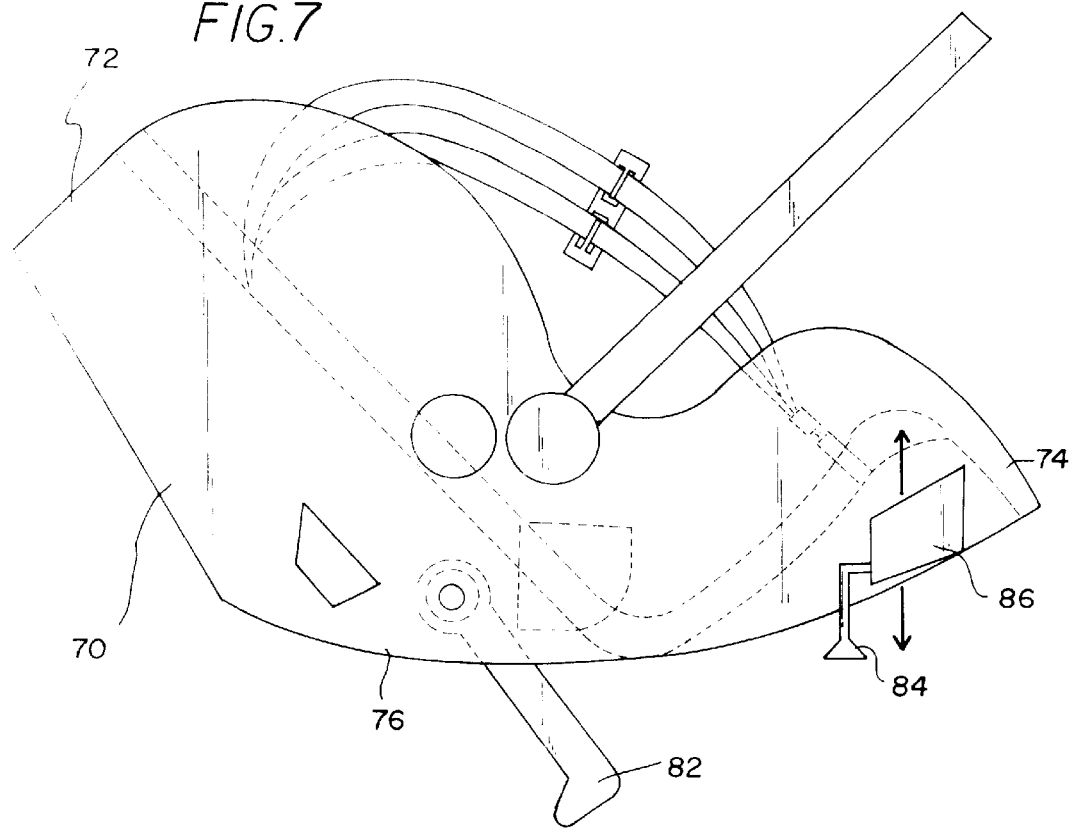
FIG. 7 is a view of the child seat removed from the stroller.
Figure 8:
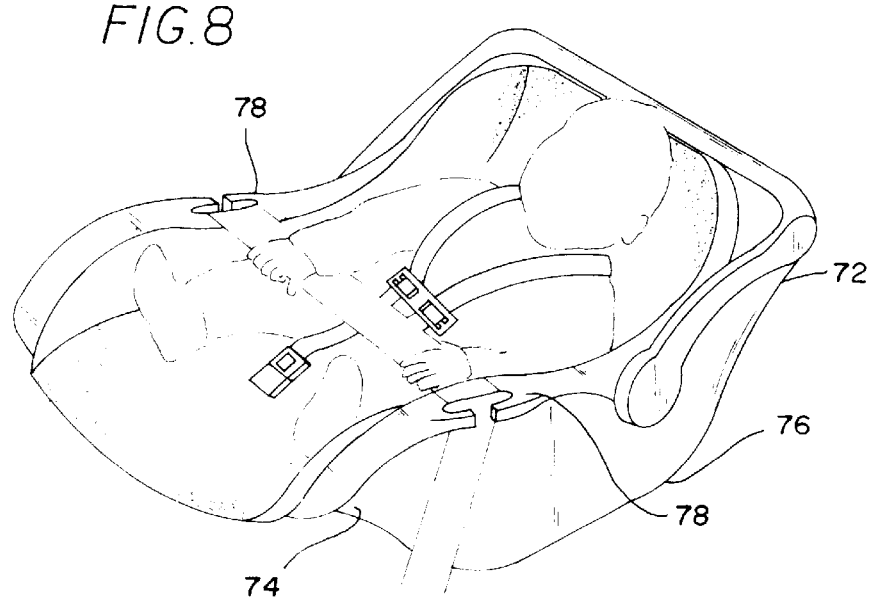
FIG. 8 is a perspective view of the child seat in a first orientation.

The seat frame thus described has two orientations, a first orientation depicted in FIG. 8, and a second orientation depicted in FIG. 7. The seat frame's first orientation has the lap belt positioned through the receiving channels.

Additionally, the intermediate extent of the seat is positioned upon the vehicle seat. In this orientation the child is facing the rear of the vehicle. This orientation is generally for use with children between 5 and 20 pounds.

The second orientation is achieved with the leg pivoted away from the outer external face of the seat frame. Furthermore, the lower extent of the seat and the leg are positioned upon the vehicle seat. This second orientation positions the child so they are facing toward the front of the vehicle. This orientation is generally for use with children between 20 and 40 pounds.

Thus, the seat can be used in conjunction with the stroller frame. When attached to the frame the seat has two orientations. Alternatively, the seat can be removed from stroller frame and used independently. When used independently the seat has two orientations, the first orientation depicted in FIG. 7 and the second orientation depicted in FIG. 9. When in the orientation depicted in FIG. 7, the rocking plunger can be activated to thereby gently rock the seat in a back and forth manner.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A convertible multi-function stroller comprising in combination:

a first side frame member having a lower extent with a pair of wheels rotatably secured thereon, a substantially horizontal upper extent, and an intermediate extent therebetween;

a second side frame member having a lower extent with a pair of wheels rotatably secured thereon, a substantially horizontal upper extent, and an intermediate extent therebetween;

a rectangular basket interconnecting the lower extents of the first and second side frames;

a first side lower securing means fixedly connected to the intermediate extent of the first side frame, the first side lower securing means comprising a circular housing with an associated peripheral edge with teeth formed thereon;

a first side upper securing means fixedly connected to the intermediate extent of the first side frame above the first side lower securing means and in axial alignment therewith, the first side upper securing means comprising a circular housing with an associated peripheral edge with teeth formed thereon;

a second side lower securing means fixedly connected to the intermediate extent of the second side frame, the second side lower securing means comprising a circular housing with an associated peripheral edge with teeth formed thereon;

a second side upper securing means fixedly connected to the intermediate extent of the second side frame above the second side lower securing means and in axial alignment therewith, the second side upper securing means comprising a circular housing with an associated peripheral edge with teeth formed thereon;

a single child seat adapted to be removably and selectively secured to the first and second side frames, the child seat having a first side with a securing means secured thereto, the first side securing means of the child seat adapted to be interconnected to one of the first side securing means of the frame, the second side securing means of the child seat adapted to be interconnected to one of the second side securing means of the frame; and a telescopic handle pivotally secured to the child seat.

\* \* \* \* \*